(12) United States Patent
Lim (10) Patent No.: US 12,233,828 B2
(45) Date of Patent: Feb. 25, 2025

(54) ACTUATOR FOR ELECTRIC PARKING BRAKE

(71) Applicant: HL MANDO CORPORATION, Gyeonggi-do (KR)

(72) Inventor: Woochul Lim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 373 days.

(21) Appl. No.: 17/601,037

(22) PCT Filed: Mar. 26, 2020

(86) PCT No.: PCT/KR2020/004126
§ 371 (c)(1),
(2) Date: Oct. 1, 2021

(87) PCT Pub. No.: WO2020/204467
PCT Pub. Date: Oct. 8, 2020

(65) Prior Publication Data
US 2022/0169226 A1 Jun. 2, 2022

(30) Foreign Application Priority Data
Apr. 3, 2019 (KR) .................. 10-2019-0038993

(51) Int. Cl.
*B60T 13/74* (2006.01)
*F16D 65/18* (2006.01)
*F16D 121/20* (2012.01)
*F16D 121/24* (2012.01)
*F16D 125/48* (2012.01)
(Continued)

(52) U.S. Cl.
CPC ............ *B60T 13/746* (2013.01); *F16D 65/18* (2013.01); *F16D 2121/20* (2013.01);
(Continued)

(58) Field of Classification Search
CPC .. B60T 13/741; B60T 13/746; F16D 2121/20; F16D 2121/24; F16D 2125/42; F16D 2125/48; F16D 65/18
See application file for complete search history.

(56) References Cited

U.S. PATENT DOCUMENTS 10,088,044 B2 * 10/2018 Yu ........................... F16D 65/16
10,823,242 B2 * 11/2020 Choi ..................... B60T 13/741
2006/0054428 A1 * 3/2006 Danne ..................... F16D 55/00
188/72.4

FOREIGN PATENT DOCUMENTS

CN 108458004 B * 3/2021 .......... F16D 55/226
DE 103 49 078 5/2005
(Continued)

OTHER PUBLICATIONS

International Search Report for PCT/KR2020/004126 mailed on Jul. 8, 2020 and its English translation from WIPO (now published as WO 2020/204467).

(Continued)

*Primary Examiner* — Vishal R Sahni
(74) *Attorney, Agent, or Firm* — WOMBLE BOND DICKINSON (US) LLP (57) ABSTRACT

An actuator of an electric parking brake is disclosed. An actuator of an electric parking brake according to one embodiment of the present invention includes a driving unit which outputs a rotational force through a driving shaft, a first gear unit which receives the rotational force from the driving unit, a second gear unit including a rotation shaft which receives the rotational force from the first gear unit to rotate, and a driving shaft control unit which is disposed on the driving shaft, provides a degree of rotational freedom to the driving shaft during braking, and fixes the driving shaft (Continued)

to prevent reverse rotation of the driving shaft due to a reverse rotation torque when the braking is ended.

8 Claims, 7 Drawing Sheets

(51) Int. Cl.
    *F16D 125/50*       (2012.01)
    *F16D 125/52*       (2012.01)

(52) U.S. Cl.
    CPC ...... *F16D 2121/24* (2013.01); *F16D 2125/48* (2013.01); *F16D 2125/50* (2013.01); *F16D 2125/52* (2013.01)

(56) References Cited

FOREIGN PATENT DOCUMENTS

| DE | 10 2010 000 737 | | 8/2010 | |
|----|----|----|----|----|
| DE | 10 2018 001 328 | | 8/2018 | |
| KR | 10-2010-0030012 | | 3/2010 | |
| KR | 20100030012 A | * | 3/2010 | |
| KR | 20110120024 A | * | 11/2011 | |
| KR | 10-1331783 | | 11/2013 | |
| KR | 10-1433755 | | 8/2014 | |
| KR | 10-1682715 | | 12/2016 | |
| KR | 10-1701291 | | 2/2017 | |
| WO | WO-2015082299 A1 | * | 6/2015 | ............ B60T 13/741 |

OTHER PUBLICATIONS

Written Opinion of the International Searching Authority for PCT/KR2020/004126 mailed on Jul. 8, 2020 and its English translation by Google Translate (now published as WO 2020/204467).

Office Action dated Oct. 16, 2024 for German Patent Application No. 11 2020 001 721.4 and its English translation by Google Translate.

* cited by examiner

ACTUATOR FOR ELECTRIC PARKING BRAKE

CROSS-REFERENCE TO RELATED APPLICATIONS

The present application is the national stage of International Patent Application No. PCT/KR2020/004126 filed on Mar. 26, 2020, which claims the priority to Korean Patent Application No. 10-2019-0038993 filed in the Korean Intellectual Office on Apr. 3, 2019, the entire contents of which are incorporated herein by reference.

TECHNICAL FIELD

The present invention relates to an actuator of an electric parking brake and, more specifically, to an actuator of an electric parking brake which electrically provides a braking force required for parking a vehicle.

BACKGROUND ART

The electric parking brake (EPB) is a brake which generates a braking force required for parking using a motor driven by electricity instead of hydraulically generating the braking force. In an electric parking brake of a small private vehicle such as the conventional sedan, a spindle unit is mainly employed as a conversion unit for converting a rotational force of a motor into linear movement to press a disc of a vehicle, and in an electric parking brake of a large commercial vehicle such as a truck, since a large braking force is required for parking, a ball ramp unit having efficiency higher than the spindle unit is mainly employed as a conversion unit.

Meanwhile, in the case of the small private vehicle, there is no problem that a parking force is transmitted in a reverse direction so that a gear is rotated in a reverse direction after parking. However, in the case of the large commercial vehicle, there is a problem of reverse gear rotation due to a reverse rotation torque after parking, and thus, a locking structure for preventing the reverse gear rotation is required.

In this situation, development of an actuator of an electric parking brake, which provides a structure capable of effectively preventing reverse gear rotation due to a reverse rotation torque after parking performed by the electric parking brake, is required.

(Patent Document 1) Korean Patent Registration No. 10-1331783, "ELECTRIC CALIPER BRAKE WITH PARKING FUNCTION" announced on Nov. 21, 2013.

DISCLOSURE

Technical Problem

The present invention is directed to providing an actuator of an electric parking brake, which effectively prevents gear reverse rotation due to a reverse rotation torque after parking, in an electric parking brake.

In addition, the present invention is directed to providing an actuator of an electric parking brake which effectively prevents a decrease in braking force due to a reverse rotation torque after parking.

Technical Solution

One aspect of the present invention provides an actuator of an electric parking brake, including a driving unit which outputs a rotational force through a driving shaft, a first gear unit which receives the rotational force from the driving unit, a second gear unit including a rotation shaft which receives the rotational force from the first gear unit to rotate, and a driving shaft control unit which is disposed on the driving shaft, provides a degree of rotational freedom to the driving shaft during braking, and fixes the driving shaft to prevent reverse rotation of the driving shaft due to a reverse rotation torque when the braking is ended.

The driving shaft control unit may include a solenoid locking device configured to fix the driving shaft.

The solenoid locking device may provide the degree of rotational freedom to the driving shaft when a current is applied and fix the driving shaft when a current is not applied.

The driving shaft may protrude from one end and the other end of the driving unit, the first gear unit may be disposed at a side of the one end, and the driving shaft control unit may be disposed at a side of the other end.

The second gear unit may further include an inner gear coupled to the rotation shaft and an outer gear having an inner circumferential surface coupled to the inner gear and an outer circumferential surface, on which gear teeth engaged with the first gear unit are provided, and formed in a ring shape.

An outer circumferential surface of the inner gear may be coupled to the inner circumferential surface of the outer gear.

The inner gear may include a small diameter unit coupled to the rotation shaft and having an outer circumferential surface on which gear teeth are provided and a large diameter unit which is connected to the small diameter unit and of which a diameter is increased.

The actuator of the electric parking brake may further include a speed reduction unit which increases a rotational torque transmitted by the second gear unit.

The speed reduction unit may include a plurality of planetary gears disposed to be engaged with the gear teeth provided on the outer circumferential surface of the small diameter unit of the inner gear, a ring gear which is fixedly disposed with respect to the rotation shaft as gear teeth provided on an inner circumferential surface of the ring gear are engaged with the planetary gears, and a carrier coupled to the rotation shaft and rotation shafts of the planetary gears.

Advantageous Effects

According to one embodiment of the present invention, a degree of rotational freedom can be provided to a rotation shaft during braking, and gear reverse rotation due to a reverse rotation torque after parking can be prevented using a driving shaft control unit which prevents the gear reverse rotation due to the reverse rotation torque by fixing the rotation shaft when the braking is ended.

MODES OF THE INVENTION

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to descriptions are omitted in the drawings in order to clearly explain the present invention, and the same or similar parts are denoted by the same reference numerals throughout this specification.

It should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Figure 1:
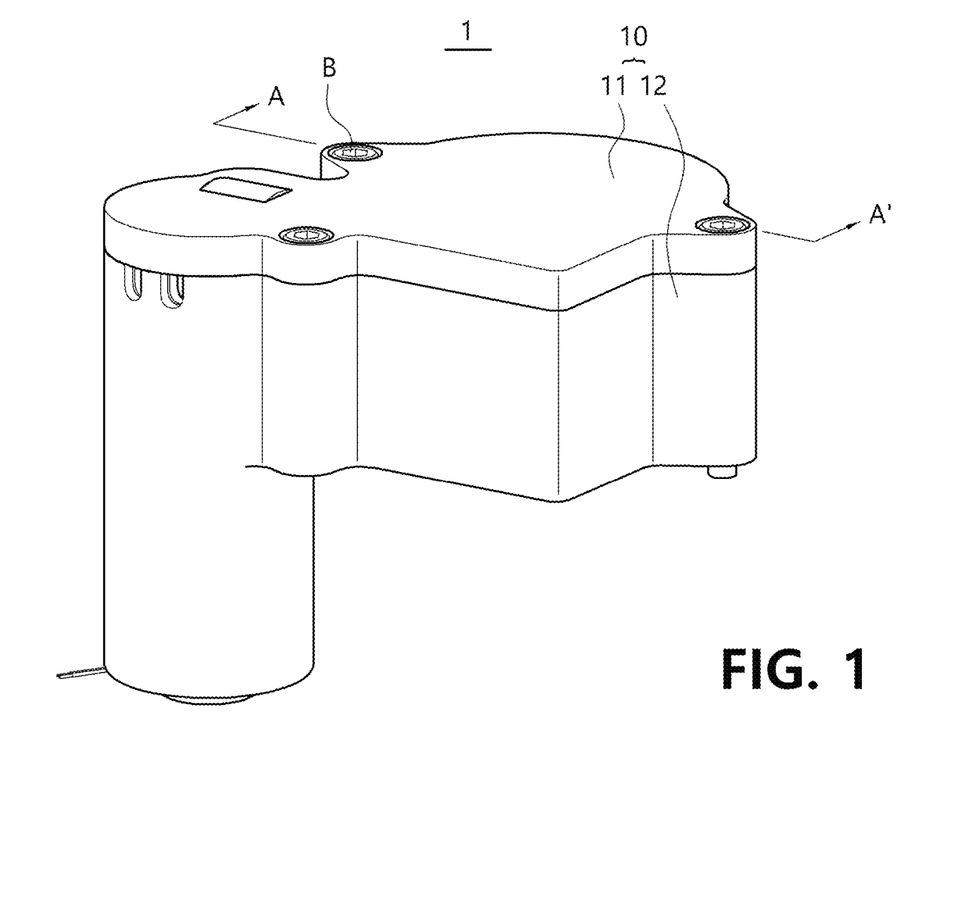
FIG. 1 is a perspective view illustrating an actuator of an electric parking brake according to one embodiment of the present invention.
Figure 2:
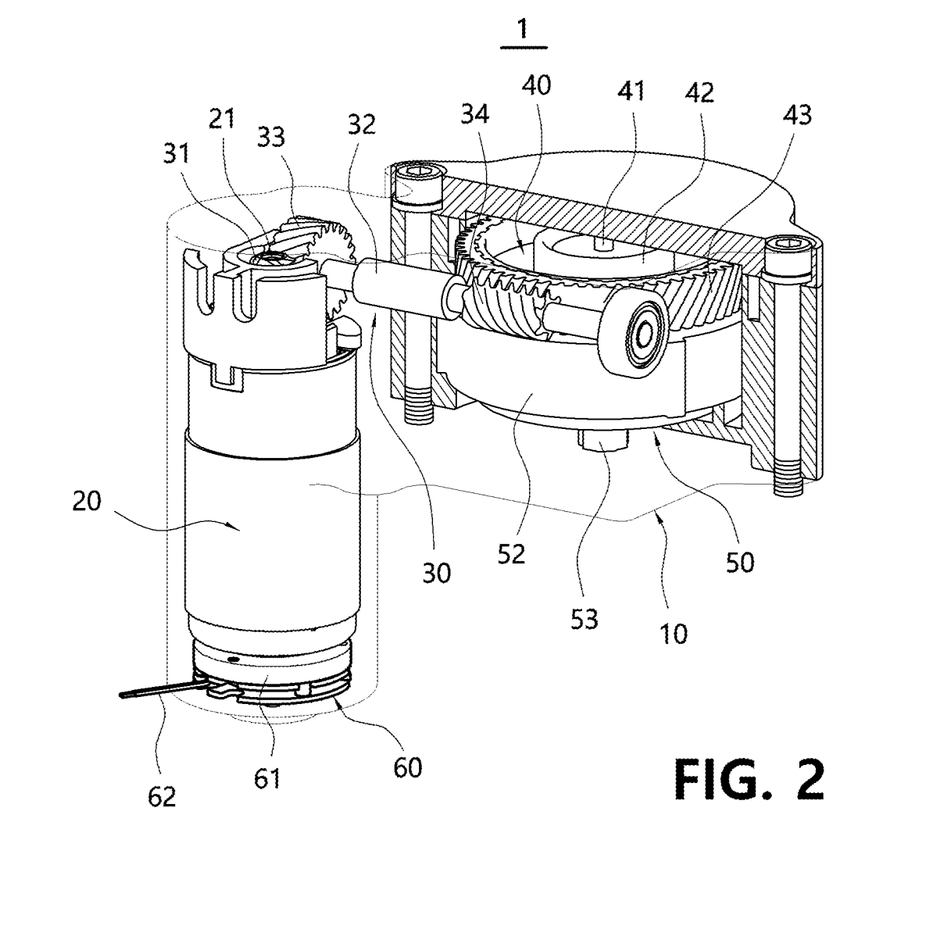
FIG. 2 is a view illustrating a housing of the actuator of the electric parking brake according to one embodiment of the present invention, wherein a part of the housing is transparently shown and another part thereof is cut.
Figure 3:
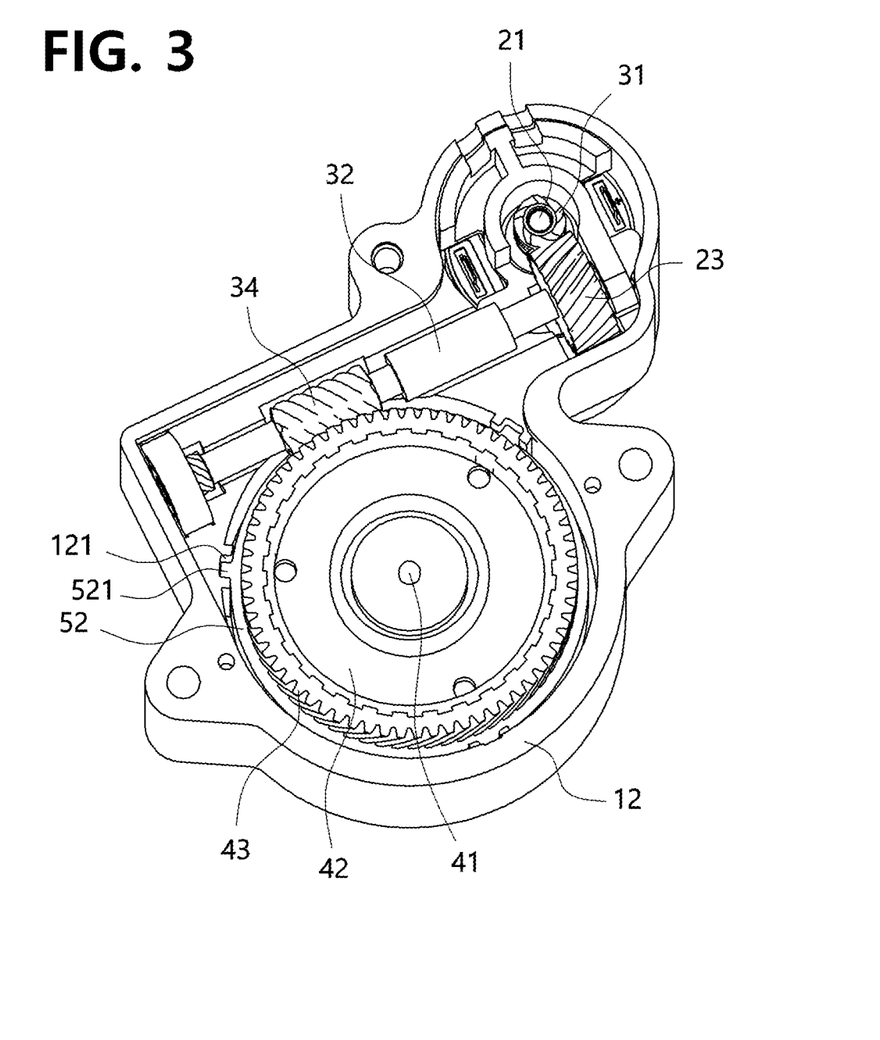
FIG. 3 is a view illustrating a state in which an upper housing of the actuator of the electric parking brake according to one embodiment of the present invention is removed when viewed from above.
Figure 4:
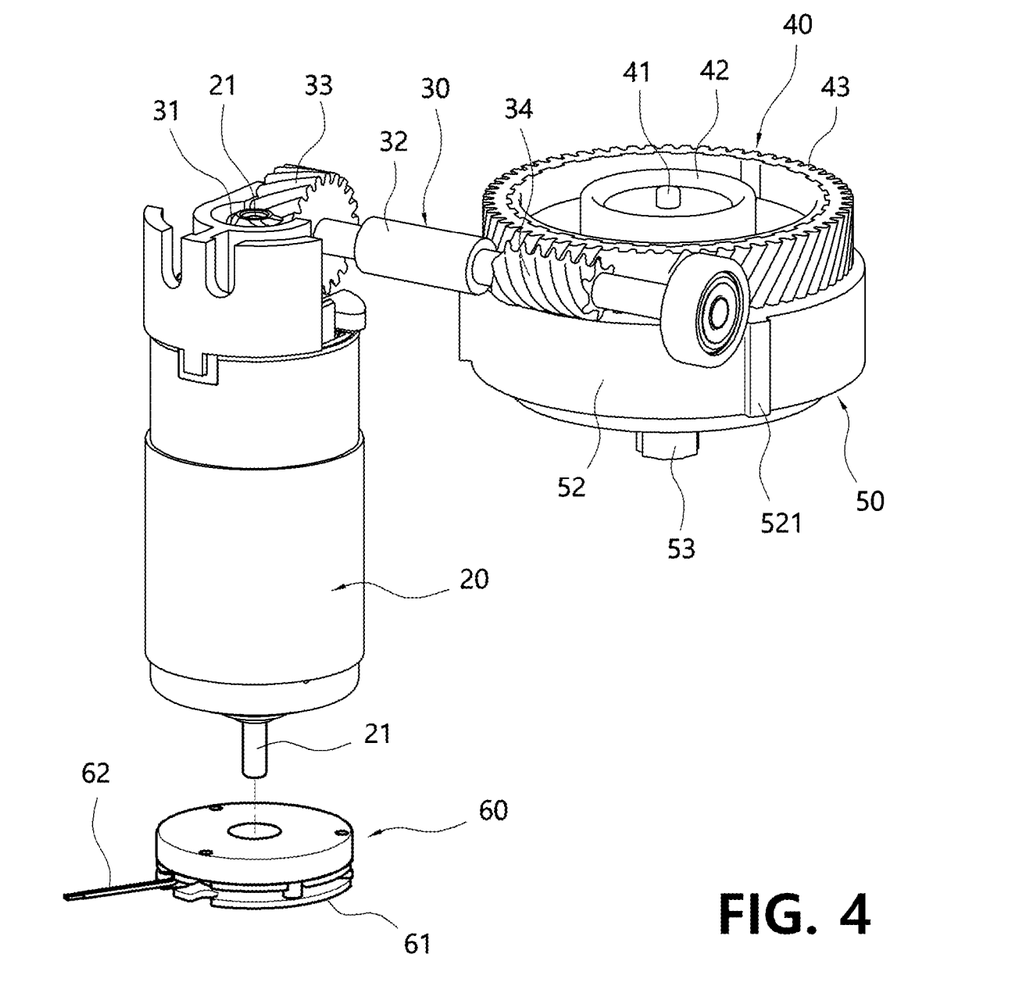
FIG. 4 is a perspective view illustrating a state in which the housing is removed and a driving shaft control unit is separated from the actuator of the electric parking brake according to one embodiment of the present invention.

In FIG. 1, a perspective view of an actuator of an electric parking brake according to one embodiment of the present invention is illustrated, and in FIG. 2, a view of a housing of the actuator of the electric parking brake according to one embodiment of the present invention is illustrated, wherein a part of the housing is transparently shown and another part thereof is cut. FIG. 3 is a view illustrating a state in which an upper housing of the actuator of the electric parking brake according to one embodiment of the present invention is removed when viewed from above. In addition, FIG. 4 is a perspective view of a state, in which the housing is removed and a driving shaft control unit is separated from the actuator of the electric parking brake according to one embodiment of the present invention.

An actuator 1 of the electric parking brake according to one embodiment of the present invention is a brake which is installed in a vehicle and electronically provides a braking force required for parking of the vehicle. The actuator 1 of the electric parking brake according to one embodiment of the present invention provides a self-locking structure which effectively prevents reverse gear rotation due to a reverse rotation torque after braking performed by the electric parking brake. The actuator 1 of the electric parking brake according to one embodiment of the present invention may be applied to a large commercial vehicle such as a truck.

Referring to FIGS. 1 to 4, the actuator 1 of the electric parking brake according to one embodiment of the present invention may include a housing 10, a driving unit 20, a first gear unit 30, a second gear unit 40, a speed reduction unit 50, and a driving shaft control unit 60.

The actuator 1 of the electric parking brake according to one embodiment of the present invention generates power required for a parking brake using the driving unit 20 in a case in which a braking force is required for parking the vehicle in a state in which the actuator 1 of the electric parking brake is installed in the vehicle. A rotational force generated by the driving unit 20 is transmitted to the speed reduction unit 50 through the first gear unit 30 and the second gear unit 40. In addition, the speed reduction unit 50 may transmit the rotational force to a conversion unit (not shown) which converts the rotational force into linear movement to press a disc of the vehicle to generate a braking force.

In this case, the conversion unit may include various devices which convert rotation movement into linear movement. For example, the conversion unit may include a spindle unit. Meanwhile, one embodiment of the present invention is applied to a large commercial vehicle, in which a large braking force may be transmitted as a torque in a reverse direction during parking in order to effectively prevent reverse gear rotation due to a reverse rotation torque. In consideration of this, the conversion unit may also include a ball ramp, which is widely used in an electric parking brake of the large commercial vehicle because efficiency of the ball ramp is relatively higher than that of a spindle, when the present invention is applied.

When a reverse direction torque is generated after braking, the reverse direction torque is transmitted to the driving unit 20 through the speed reduction unit 50, the second gear unit 40, and the first gear unit 30, and when a driving shaft 21 of the driving unit 20 is rotated due to the reverse direction torque, there is a problem of loss of the braking force. In the actuator 1 of the electric parking brake according to one embodiment of the present invention, the driving shaft control unit 60 prevents reverse rotation, which is due to a reverse rotation torque, of the driving shaft 21 of the driving unit 20 to solve such a problem.

Hereinafter, the housing 10, the driving unit 20, the first gear unit 30, the second gear unit 40, the speed reduction unit 50, and the driving shaft control unit 60 included in the actuator 1 of the electric parking brake according to one embodiment of the present invention will be described in more detail.

The housing 10 accommodates components such as the driving unit 20, the first gear unit 30, the second gear unit 40, the speed reduction unit 50, and the driving shaft control unit 60. That is, the housing 10 provides a space in which the driving unit 20, the first gear unit 30, the second gear unit 40, the speed reduction unit 50, and the driving shaft control unit 60 are disposed. As shown in FIG. 1, the housing 10 may include an upper housing 11 and a lower housing 12.

In addition, as shown in FIG. 3, one or more fixing grooves 121 may be formed in a side surface of the lower housing 12 constituting the space, in which the second gear unit 40 and the speed reduction unit 50 are disposed, in a longitudinal direction. As will be described below, protrusions 521 of a ring gear 52 of the speed reduction unit 50 may be inserted into the fixing grooves 121 to fix the ring gear 52.

Meanwhile, the housing 10 may be installed in the vehicle and may also provide an interface for connecting the actuator 1 of the electric parking brake according to one embodiment of the present invention and other components of the vehicle.

The driving unit 20 generates a rotational force. In one embodiment of the present invention, the driving unit 20 may include a motor. The driving unit 20 may be controlled by an electronic control unit (ECU) of the vehicle and provide the rotational force for generating a braking force required for parking the vehicle. Accordingly, the vehicle, in which the actuator 1 of the electric parking brake according to one embodiment of the present invention is installed, may electrically generate the braking force required for parking without complex hydraulic components.

The first gear unit 30 receives the rotational force from the driving unit 20. Specifically, the first gear unit 30 primarily receives the rotational force of the driving unit 20 and transmits the rotational force to the second gear unit 40. In one embodiment of the present invention, the first gear unit 30 may include a first worm 31 coupled to an output shaft of the driving unit 20, a first worm wheel 32 engaged with the first worm 31 and rotated, a transmission shaft 33 connected to the first worm wheel 32 and rotated, and a second worm 34 disposed on the transmission shaft 33, engaged with the second gear unit 40, and rotated.

The second gear unit 40 receives the rotational force from the first gear unit 30 and rotates. The second gear unit 40 may transmit the rotational force to the speed reduction unit 50. In other words, the second gear unit 40 may be connected to the speed reduction unit 50 to transmit the rotational force received from the first gear unit 30 to the speed reduction unit 50, the speed reduction unit 50 may transmit the rotational force to the conversion unit, and the conversion unit may convert the rotational force into linear movement to generate a braking force required for parking.

Figure 5:
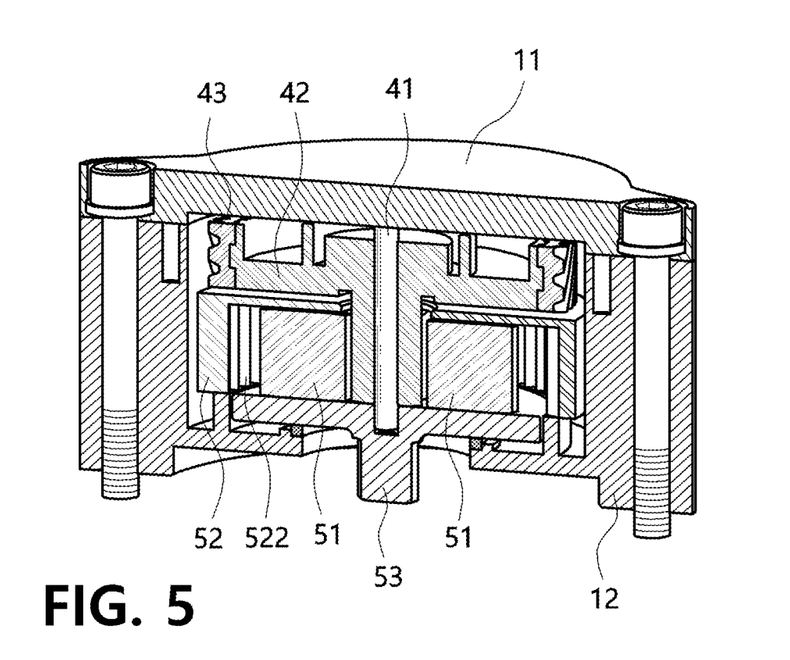
FIG. 5 is a cross-sectional view taken along line A-A' of FIG. 1.
Figure 6:
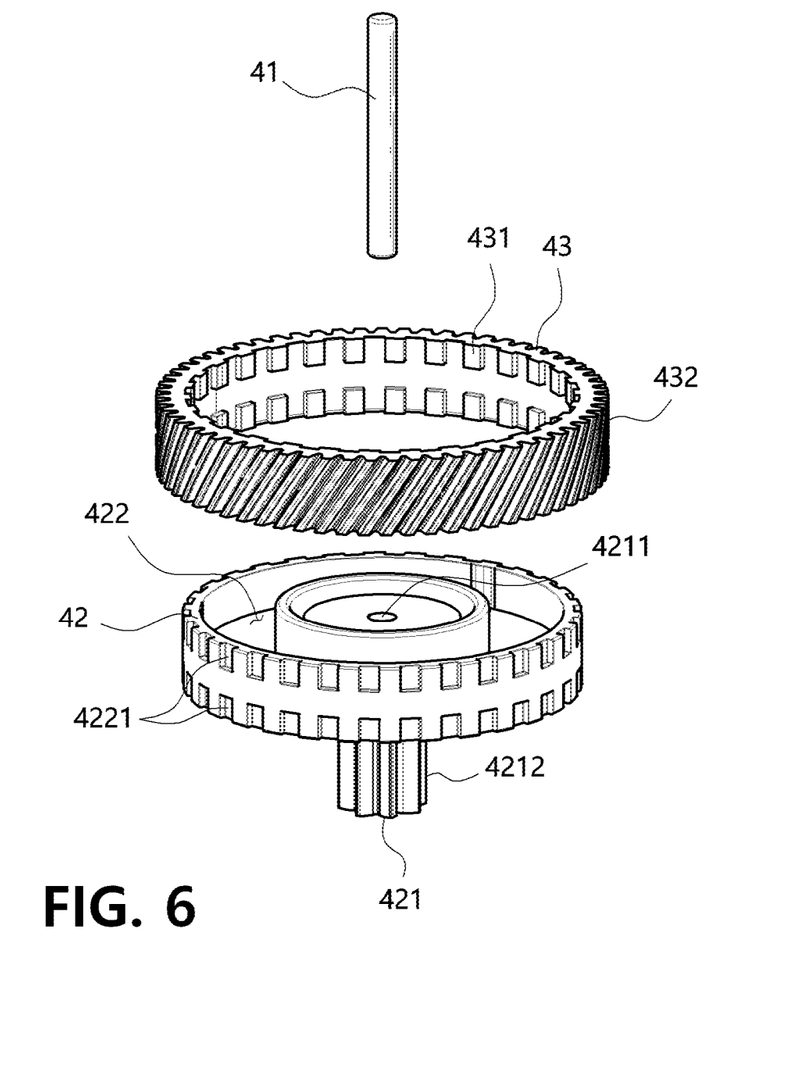
FIG. 6 is an exploded perspective view illustrating a second gear unit of the actuator of the electric parking brake according to one embodiment of the present invention.

Referring to FIGS. 5 and 6, in one embodiment of the present invention, the second gear unit 40 may include a rotation shaft 41, an inner gear 42, and an outer gear 43.

The rotation shaft 41 receives a rotational force from the inner gear 42 to rotate and transmits the rotational force to other components. In one embodiment of the present invention, the rotation shaft 41 may transmit the rotational force of the second gear unit 40 to the speed reduction unit 50.

The inner gear 42 is coupled to the rotation shaft 41 and transmits the rotational force, which is transmitted through the outer gear 43, of the first gear unit 30 to the rotation shaft 41. An outer circumferential surface of the inner gear 42 may be coupled to an inner circumferential surface of the outer gear 43.

More specifically, the inner gear 42 may include a small diameter unit 421 and a large diameter unit 422.

The small diameter unit 421 is a portion through which a coupling hole 4211 coupled to the rotation shaft 41 is formed to pass in a longitudinal direction, one end portion of the small diameter unit 421 is connected to the large diameter unit 422, and gear teeth 4212 are formed on an outer circumferential surface on a predetermined section of the other end portion. In one embodiment of the present invention, the gear teeth 4212 of the small diameter unit 421 are engaged with a plurality of planetary gears 51 of the speed reduction unit 50 to serve as a sun gear.

The large diameter unit 422 is formed so that a diameter of the large diameter unit 422 increases from an outer circumferential surface of the one end portion of the small diameter unit 421. The large diameter unit 422 is coupled to the outer gear 43 and transmits the rotational force transmitted through the outer gear 43 to the small diameter unit 421. In addition, in one embodiment of the present invention, coupling grooves 4221 for being stably coupled to the outer gear 43 are formed in an outer circumferential surface of the large diameter unit 422. Specifically, the coupling grooves 4221 may be formed along the outer circumferential surface of the large diameter unit 422 to be recessed and spaced apart from each other at predetermined intervals and may be formed in parallel in an upper end and a lower end along the outer circumferential surface of the large diameter unit 422.

The outer gear 43 may be formed as a gear having a ring shape in which the inner circumferential surface of the outer gear 43 is coupled to the inner gear 42, and gear teeth 432 engaged with the first gear—unit 30 are provided on an outer circumferential surface of the outer gear 43. As the gear teeth 432 formed on the outer circumferential surface of the outer gear 43 are engaged with the second worm 34 of the first gear unit 30, the outer gear 43 receives the rotational force of the first gear unit 30.

The outer gear 43 may be formed in the ring shape and include coupling protrusions 431 on the inner circumferential surface thereof. The coupling protrusions 431 are formed to correspond to the coupling grooves 4221 formed in the outer circumferential surface of the large diameter unit 422 of the inner gear 42 and allow the outer gear 43 and the inner gear 42 to be stably coupled.

In one embodiment of the present invention, the inner gear 42 and the outer gear 43 may be integrally formed in an insertion-injection manner or the like. In this case, the coupling grooves 4221 of the inner gear 42 and the coupling protrusions 431 of the outer gear 43 help stable coupling of the inner gear 42 and the outer gear 43.

The speed reduction unit 50 increases a rotational torque transmitted by the second gear unit 40. The speed reduction unit 50 increases the rotational force generated by the driving unit 20 and transmitted to the conversion unit through the first gear unit 30 and the second gear unit 40 to allow a sufficient force for parking to be generated in the conversion unit.

Figure 7:
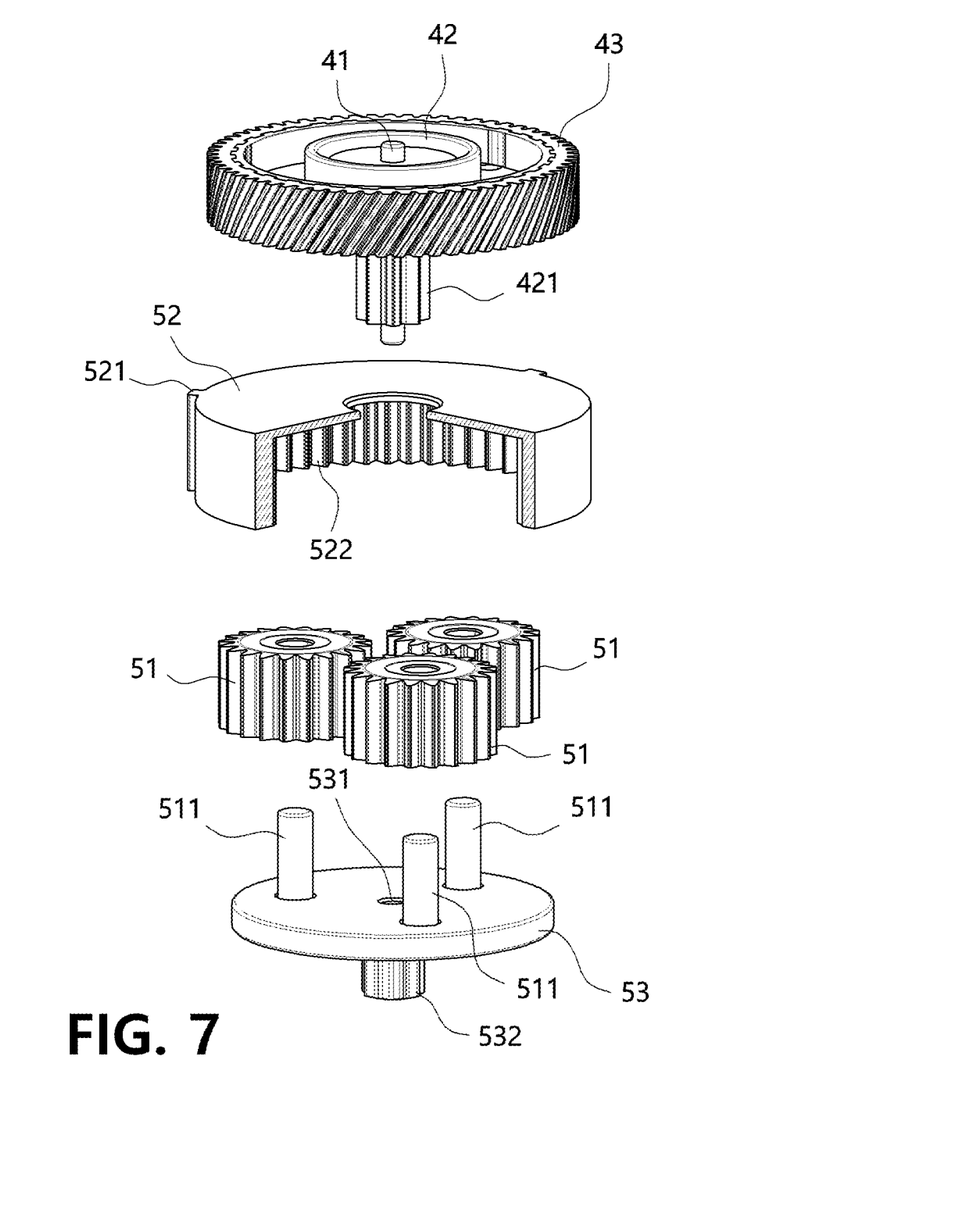
FIG. 7 is an exploded perspective view illustrating a speed reduction unit of the actuator of the electric parking brake according to one embodiment of the present invention.

Referring to FIGS. 5 and 7, the speed reduction unit 50 may include the plurality of planetary gears 51, the ring gear 52, and a carrier 53.

The plurality of planetary gears 51 are disposed to be engaged with the gear teeth 4212 provided on the outer circumferential surface of the small diameter unit 421 of the inner gear 42. That is, the plurality of planetary gears 51 are disposed to be engaged with the small diameter unit 421 of the inner gear 42, wherein the small diameter unit 421 serves as a sun gear.

The ring gear 52 is fixedly disposed with respect to the rotation shaft 41 as gear teeth 522 disposed on an inner circumferential surface of the ring gear 52 are engaged with the plurality of planetary gears 51. Specifically, the ring gear 52 includes the protrusions 521 disposed on an outer circumferential surface thereof, and the ring gear 52 may be fixedly disposed with respect to the rotation shaft 41 as the protrusions 521 are disposed to be inserted into the fixing grooves 121 formed in the lower housing 12.

The carrier 53 is coupled to the rotation shaft 41 and rotation shafts 511 of the plurality of planetary gears 51. To this end, an insertion groove 531, into which the rotation shaft 41 is inserted, may be formed in one surface of the carrier 53. The carrier 53 is coupled to the rotation shaft 41 and the rotation shafts 511 of the plurality of planetary gears 51 and rotated so as to output an amplified rotational force. In this case, the carrier 53 may output the amplified rotational force to the conversion unit.

The driving shaft control unit 60 is disposed on the driving shaft 21 to provide a degree of rotational freedom to the driving shaft 21 for braking and fixes the driving shaft 21 to prevent reverse rotation, which is due to a reverse rotation torque, of the driving shaft 21 when the braking is ended. According to one embodiment of the present invention, the driving shaft control unit 60 may prevent the reverse rotation of the driving shaft 21 due to the reverse rotation torque, and thus loss of the braking force due to the reverse rotation torque after parking can be prevented.

The driving shaft control unit 60 is disposed at one side of the driving unit 20. In one embodiment of the present invention, the driving shaft 21 of the driving unit 20 protrudes from one end and the other end of the driving unit 20, the first gear unit 30 is disposed on the one end, and the driving shaft control unit 60 is disposed at a side of the other end. Through such an arrangement, a space, in which the first gear unit 30 and the second gear unit 40 are disposed, of the one end of the driving shaft 21 may be effectively secured.

In one embodiment of the present invention, the driving shaft control unit 60 may include a solenoid locking device capable of fixing the driving shaft 21. In this case, the solenoid locking device may operate in a manner of providing a degree of rotational freedom to the driving shaft 21 when a current is applied and fixing the driving shaft 21 when a current is not applied.

More specifically, the driving shaft control unit 60 may include a solenoid 61, which allows or restricts rotation of the driving shaft 21 according to whether a current is supplied, and a wire 62 through which the current is applied to the solenoid 61.

In addition, the solenoid locking device may be formed as one of various types, and the driving shaft control unit 60 may include an arbitrary solenoid locking device applied to restrict rotation of a conventional rotation shaft.

While the embodiments of the present invention have been described above, the spirit of the present invention is not limited to the embodiments proposed in this specification, and other embodiments may be easily suggested by adding, changing, and removing components by those skilled in the art and will fall within the spiritual range of the present invention.

The invention claimed is:

1. An actuator of an electric parking brake, comprising:
a driving unit configured to provide a rotational force through a driving shaft;
a first gear unit configured to receive the rotational force from the driving unit;
a second gear unit including a rotation shaft configured to receive the rotational force from the first gear unit to rotate;
a driving shaft control unit disposed on the driving shaft, and configured to provide a degree of rotational freedom to the driving shaft during braking and fix the driving shaft to prevent reverse rotation of the driving shaft due to a reverse rotation torque when the braking is ended;
a speed reduction unit configured to increase a rotational torque transmitted by the second gear unit, the speed reduction unit comprising a non-rotatable ring gear and a plurality of planetary gears rotatably engaged with an inner gear and the non-rotatable ring gear while gear teeth provided on an inner circumferential surface of the ring gear are engaged with the planetary gears,
wherein the second gear unit further includes:
the inner gear coupled to the rotation shaft; and
an outer gear having an inner circumferential surface coupled to the inner gear and an outer circumferential surface, on which gear teeth engaged with the first gear unit are provided, and formed in a ring shape,
wherein the inner circumferential surface of the outer gear has a plurality of coupling protrusions coupled with a corresponding plurality of coupling grooves formed on an outer circumferential surface of a larger diameter portion of the inner gear, and gear teeth formed on an outer circumferential surface of a smaller diameter portion of the inner gear are engaged with the plurality of planetary gears.

2. The actuator of claim 1, wherein the driving shaft control unit includes a solenoid locking device configured to fix the driving shaft.

3. The actuator of claim 2, wherein the solenoid locking device:
provides the degree of rotational freedom to the driving shaft when a current is applied; and
fixes the driving shaft when a current is not applied.

4. The actuator of claim 1, wherein:
the driving shaft protrudes from one end and the other end of the driving unit;
the first gear unit is disposed at a side of the one end; and
the driving shaft control unit is disposed at a side of the other end.

5. The actuator of claim 1, wherein an outer circumferential surface of the inner gear is coupled to the inner circumferential surface of the outer gear.

6. The actuator of claim 1, wherein the inner gear includes:
a small diameter unit coupled to the rotation shaft and having an outer circumferential surface on which gear teeth are provided; and
a large diameter unit which is connected to the small diameter unit and of which a diameter is increased.

7. The actuator of claim 1, wherein:
the plurality of planetary gears are disposed to be engaged with the gear teeth provided on the outer circumferential surface of the small diameter unit of the inner gear, and
the ring gear is fixedly disposed with respect to the rotation shaft while the gear teeth provided on the inner circumferential surface of the ring gear are engaged with the planetary gears,
the speed reduction unit further comprises a carrier coupled to the rotation shaft and rotation shafts of the planetary gears.

8. The actuator of claim 1, wherein the inner circumferential surface of the outer gear directly contacts the inner gear coupled to the rotation shaft.

* * * * *